United States Patent
Jia et al.

(10) Patent No.: US 8,654,988 B2
(45) Date of Patent: Feb. 18, 2014

(54) SYNCHRONIZATION OF SIGNALS FOR MULTIPLE DATA SINKS

(75) Inventors: Zhanfeng Jia, Belmont, CA (US); David Jonathan Julian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1147 days.

(21) Appl. No.: 12/339,593

(22) Filed: Dec. 19, 2008

(65) Prior Publication Data

US 2009/0274326 A1 Nov. 5, 2009

Related U.S. Application Data

(60) Provisional application No. 61/050,479, filed on May 5, 2008.

(51) Int. Cl.
*H04B 3/00* (2006.01)
(52) U.S. Cl.
USPC .................................. 381/77; 381/2; 381/311
(58) Field of Classification Search
USPC ........ 381/2, 77, 311; 370/503, 509, 510, 517, 370/519
See application file for complete search history.

(56) References Cited

U.S. PATENT DOCUMENTS

| | | | |
|---|---|---|---|
| 6,424,820 B1 * | 7/2002 | Burdick et al. | 455/41.1 |
| 7,099,354 B2 | 8/2006 | Keating | |
| 7,151,945 B2 | 12/2006 | Myles et al. | |
| 7,209,795 B2 | 4/2007 | Sullivan et al. | |
| 7,392,102 B2 | 6/2008 | Sullivan et al. | |
| 2003/0137997 A1 | 7/2003 | Keating | |
| 2003/0198254 A1 * | 10/2003 | Sullivan et al. | 370/503 |
| 2003/0198255 A1 | 10/2003 | Sullivan et al. | |
| 2004/0228367 A1 | 11/2004 | Mosig et al. | |
| 2007/0147630 A1 * | 6/2007 | Chiloyan | 381/74 |
| 2007/0171853 A1 | 7/2007 | Jones et al. | |
| 2007/0206690 A1 | 9/2007 | Sperschneider et al. | |
| 2008/0226103 A1 * | 9/2008 | Schobben | 381/309 |

FOREIGN PATENT DOCUMENTS

| | | |
|---|---|---|
| DE | 10237097 | 2/2004 |
| JP | 2001127712 A | 5/2001 |
| JP | 2004104796 A | 4/2004 |
| WO | 2007031907 A2 | 3/2007 |

OTHER PUBLICATIONS

International Search Report & Written Opinion—PCT/US2009/042815, International Search Authority—European Patent Office—Jul. 22, 2009.
Taiwan Search Report—TW098114911—TIPO—Mar. 5, 2013.

* cited by examiner

*Primary Examiner* — S. V. Clark
*Assistant Examiner* — Jesse Y Miyoshi
(74) *Attorney, Agent, or Firm* — Paul S. Holdaway

(57) ABSTRACT

A data source sends a synchronization signal and information to several data sinks that use the synchronization signal and a specified parameter to determine when to process the information. The data source and data sinks may comprise wireless nodes such as, for example, a wireless audio source that sends multi-channel data to a pair of wireless earpieces. The wireless earpieces use the synchronization signal and a latency interval to determine the appropriate time to output audio based on the audio channels.

61 Claims, 10 Drawing Sheets

SYNCHRONIZATION OF SIGNALS FOR MULTIPLE DATA SINKS

CLAIM OF PRIORITY UNDER 35 U.S.C. §119

This application claims the benefit of and priority to commonly owned U.S. Provisional Patent Application No. 61/050,479, filed May 5, 2008, the disclosure of which is hereby incorporated by reference herein.

BACKGROUND

1. Field

This application relates generally to wireless communication and more specifically, but not exclusively, to synchronization of wirelessly transmitted information.

2. Introduction

A signal processing system may include several components that perform their tasks in a synchronized manner. For example, in a multi-channel audio system a given sample of an audio stream for one channel is output at substantially the same time as a corresponding sample of an audio stream for another channel. Also, in a control system, activation of one component may occur at a certain time with respect to the activation of another component. Similarly, in a monitoring system, sensing of one condition may occur at a certain time with respect to the sensing of another condition.

Synchronization may be readily achieved in cases where the components of a system are physically connected. An example of such synchronization will be described in the context of a wired stereo headphone set. The headphone set receives audio signals from a host device (e.g., a music player) and outputs the received audio signals via two earpieces in a synchronous manner. The synchronization between earpieces is measured by skew, which is defined as the relative latency between the left and right channels. It is desirable to keep the skew relatively small to provide good sound reproduction. For example, skew in excess of approximately 4-11 μs skew may be perceptible by a human listener. Providing a such small skew is readily achievable in a case where the two earpieces of a wireless stereo headphone are physically connected (e.g., where audio signals are delivered to the earpieces via a set of wires from the host device) since the signals for each channel may travel over identical signal paths and may be processed in a deterministic manner by each earpiece.

It may be more difficult, however, to achieve a desired level of synchronization in cases where the components of a system are not physically connected. As an example, in an audio system that uses wireless earpieces, the signals destined for each earpiece may not be processed in a deterministic manner by each earpiece. For example, the processing of received signals at each earpiece may take a different amount of time under different conditions (e.g., different channel conditions). Consequently, it may be more difficult to ensure that the audio output by one earpiece at a given point in time properly corresponds to the audio output by the other earpiece. Similar issues may arise in other types of wireless systems (e.g., control and monitoring systems). In view of the above, a need exists for effective synchronization techniques for signal processing systems.

SUMMARY

A summary of sample aspects of the disclosure follows. It should be understood that any reference to the term aspects herein may refer to one or more aspects of the disclosure.

The disclosure relates in some aspects to synchronizing the timing of processing operations. For example, a data source may send a synchronization signal and information to several data sinks. The synchronization signal and a specified parameter are then used to define the time at which the data sinks process the information. In some aspects the specified parameter comprises a latency interval.

The disclosure relates in some aspects to a synchronization scheme for wireless communication. For example, the data source discussed above may comprise a wireless transmitting device and the data sinks may comprise wireless receiving devices. The wireless transmitting device may transmit a synchronization signal and multiple data streams over-the-air. Each wireless receiving device may, in turn, use the synchronization signal and a latency interval to determine the appropriate time to process one of the data streams. For example, the wireless receiving devices may each provide an output signal at a time that corresponds to the time of receipt of the synchronization signal delayed by the latency interval. In this way, each of the wireless receiving devices may output their respective signals in synchronization, even if the wireless receiving devices take different amounts of time to process their respective data stream.

The disclosure relates in some aspects to synchronizing the playback time of two earpieces of a wireless stereo headphone. When connections between a host device and the headphone are established, one earpiece may be appointed as the left channel and another earpiece may be appointed as the right channel. These earpieces may not be directly connected. For example, the two earpieces may be physically detached from one another, with no wiring interconnection.

The host device may transmit audio signals to the two earpieces in a synchronous way. In one example, the host device may multicast the audio signals of both left and right channels. The two earpieces may thus receive the audio signals at the same time. In another example, the host device may transmit the left channel of the audio signals to the first earpiece and transmit the right channel of the audio signals to the second earpiece. In either case, the two transmissions may occur at essentially the same time on the host device (e.g., time Tx).

When connections are established between the host device and the earpieces, a playback latency is negotiated and agreed by the host device and by each of the two earpieces. Each earpiece may timestamp any audio signals it receives from the host device. In some aspects, it may be assumed that timestamps generated by independent earpieces are close to time Tx; but that their difference does not exceed a tolerance of $\partial$ (e.g., where $\partial$ is the maximum skew specified by an application). In the case of stereo playback, $\partial$ is typically on the order of 4 μs. Each earpiece then plays its received audio signals after a playback latency interval that follows the time indicated by the timestamp.

Operations similar to the above may be employed in systems where other types of data streams from a single sender are consumed or rendered in a synchronous manner at multiple data sinks (e.g., receivers). Such data streams may include, for example, video data, tactile information, audio data, text, sensor information, or data in a gaming application or similar applications.

BRIEF DESCRIPTION OF THE DRAWINGS

These and other sample aspects of the disclosure will be described in the detailed description and the appended claims that follow, and in the accompanying drawings, wherein:

Figure 1:
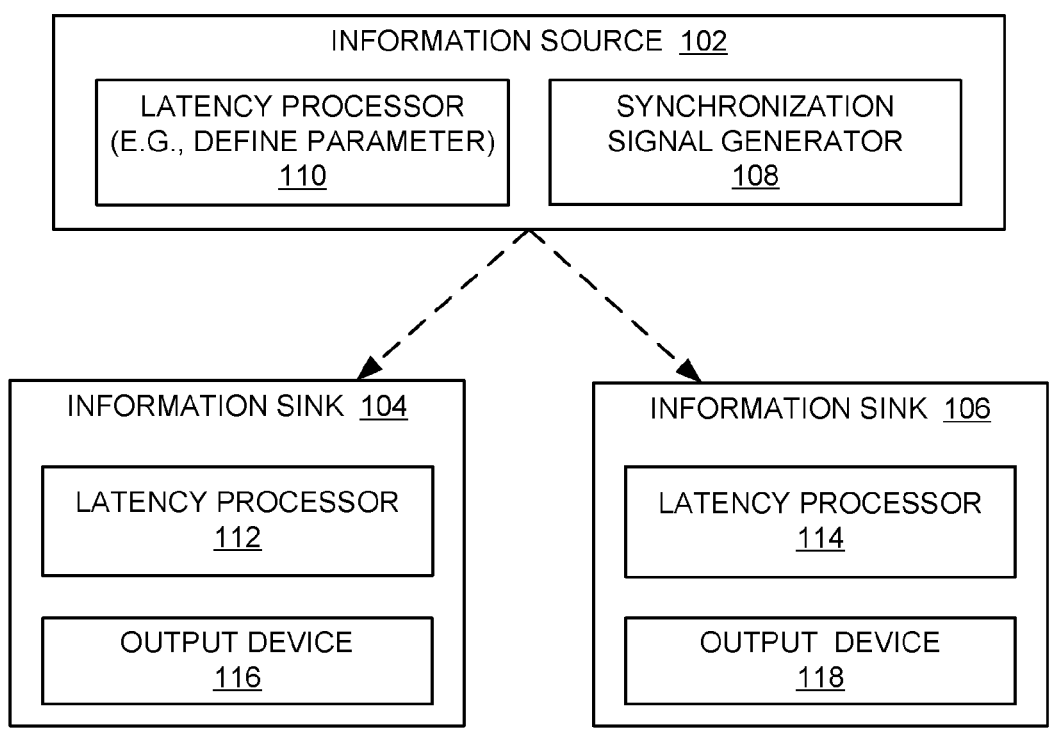
FIG. 1 is a simplified block diagram illustrating several aspects of a sample data processing system.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim. As an example of the above, in some aspects a method of wireless communication comprises: obtaining at least one parameter, wirelessly receiving a synchronization signal, wirelessly receiving information, and processing the information at a time based on the at least one parameter and the synchronization signal. In addition, in some aspects the at least one parameter specifies a latency interval and the time at which the information is processed is based on the latency interval and a time associated with the receipt of the synchronization signal.

FIG. 1 illustrates sample aspects of a data processing system 100 where an information source 102 sends information to two or more information sinks (hereafter referred to, for convenience, as information sinks 104 and 106). The information source 102 sends a synchronization signal in conjunction with the information to enable the information sinks 104 and 106 to process the information in a synchronous manner.

Each of the information sinks 104 and 106 uses the synchronization signal received from the information source 102 and a defined parameter to determine when to process the information received from the information source 102. Here, the processing of information may involve, for example, one or more of operating on the information, outputting the information (e.g., rendering the information to speakers), or invoking a control or sensing operation according to the information. In some cases the information sinks 104 and 106 may preprocess the information in some manner before commencing the processing of the information according to the synchronization signal and the defined parameter. In some aspects the defined parameter may relate to a latency interval. For example, upon receiving the synchronization signal from the information source 102, the information sink 104 may delay for an amount of time corresponding to the latency interval before processing information the information sink 104 receives from the information source 102. The information sink 106 may operate in a similar manner using the same latency interval (or, as discussed below, using a different latency interval). Thus, assuming the synchronization signal is received at the information sinks 104 and 106 at known relative times (e.g., at substantially the same time), the information sinks 104 and 106 may process received information in a synchronized manner with respect to one another. That is, the information sinks 104 and 106 may process the information at substantially the same time or at a known timing offset.

FIG. 1 illustrates sample components that may be incorporated into the information source 102 and the information sinks 104 and 106 to provide synchronization-related functionality as taught here. For example, the information source 102 may include a synchronization signal generator 108 that generates a synchronization signal. In addition, the information source 102 may include a latency processor 110 that may define (e.g., assist in the definition of) one or more latency parameters to be used by the information sinks 104 and 106. The information sinks 104 and 106 may include respective latency processors 112 and 114 that perform latency-related operations such as, for example, one or more of maintaining a latency parameter, receiving a latency parameter, defining (e.g., assisting in the definition of) a latency parameter, or controlling timing of operations based on a latency parameter. Also, the information sinks 104 and 106 may include respective output devices 114 and 116 for providing an output based on information received from the information source 102. Sample operations of these and other components that may be employed in conjunction with the teachings herein will be discussed in more detail below.

The components of the system 100 may be implemented in different ways in different applications. For example, the teachings herein may be implemented in a system where the components are attached to one another (e.g., where the components are interconnected by wires) or in a system where the components are detached from one another (e.g., a wireless system). Also, the teachings herein may be employed in conjunction with the processing of various types of information. For example, in some implementations this information may comprise control information that may be used to control certain operations at different components (e.g., control a fireworks display or other events). In some implementations this information may comprise data such as audio data, video data, sensor data, or gaming data.

Figure 2:
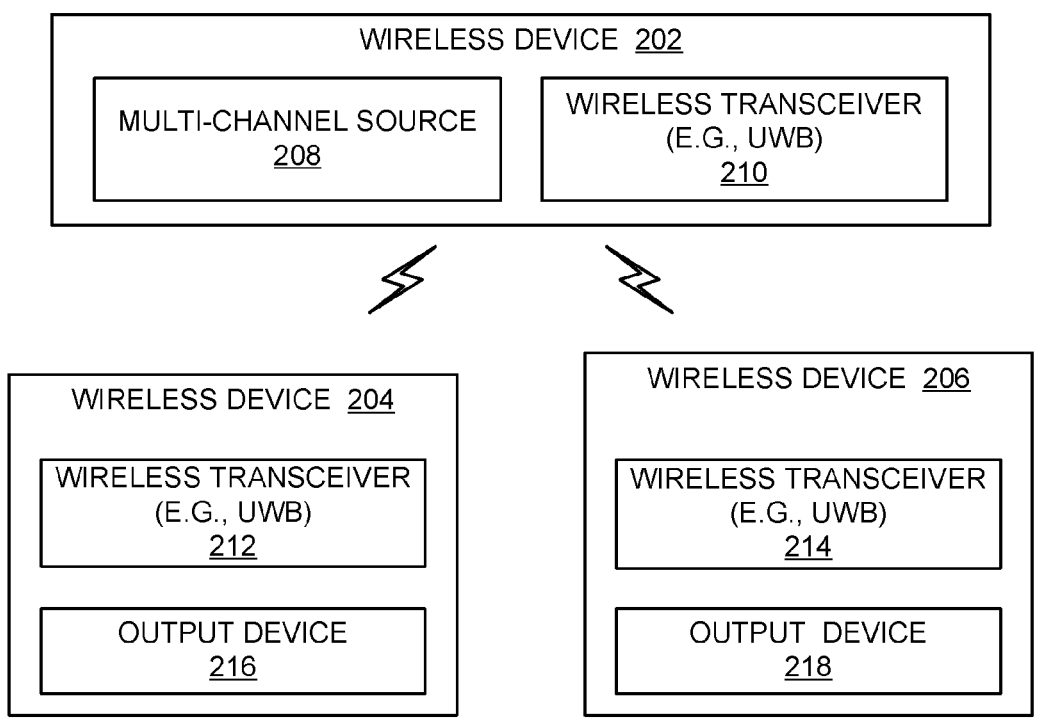
FIG. 2 is a simplified block diagram illustrating several aspects of a sample communication system.

For illustration purposes, various aspects of the disclosure will now be described in the context of a wireless communication system 200 as shown in FIG. 2 where a wireless device 202 sends multi-channel data and synchronization signals over-the-air to wireless devices 204 and 206. As mentioned above, it should be appreciated that the teachings herein may be applicable to other types of data processing systems, communication systems, components, and information.

The wireless device 202 includes a multi-channel source 208 that provides multi-channel data to be sent to the wireless devices 204 and 206. The multi-channel source 208 may comprise, for example, a device that generates data (e.g., an audio player) or a device that forwards received data (e.g., an audio receiver).

The wireless device 202 also includes a wireless transceiver 210 that transmits the data from the multi-channel source 208 and other information (e.g., signals) to the wireless devices 204 and 206. The wireless transceiver 210 may be implemented using various technologies depending on the requirements of a given application. For example, in some cases the wireless transceiver 210 comprises an ultra-wideband ("UWB") transceiver.

The wireless devices 204 and 206 include respective wireless transceivers 212 and 214 that are compatible with the wireless transceiver 210. Thus in some implementations the wireless transceivers 212 and 214 comprise UWB transceivers.

The wireless devices 204 and 206 also may include respective output devices 216 and 218 for providing an output based on the data transmitted from the wireless device 202. For example, in an implementation where the multi-channel data comprises multi-channel (e.g., stereo) audio data, the output device 216 may provide an audio output based on a first channel of the multi-channel audio data and the output device 218 may provide an audio output based on a second channel of the multi-channel audio data.

Figure 3:
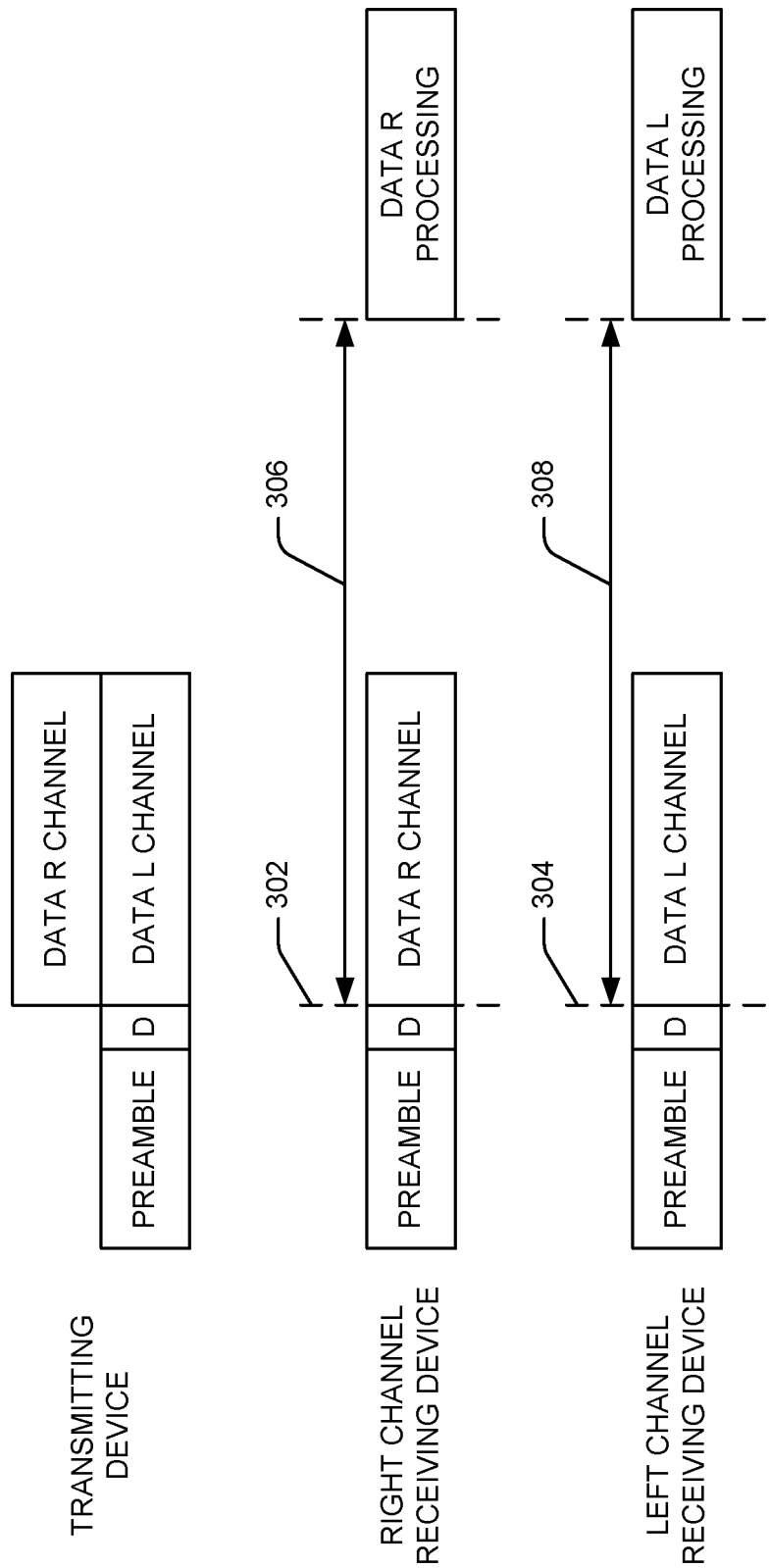
FIG. 3 is a simplified diagram illustrating sample packet transmission.

FIG. 3 illustrates a simplified example of how multi-channel data (e.g., a dual-channel stream) may be sent by the wireless device 202 and received by the wireless devices 204 and 206. As indicated by the top portion of FIG. 3, a transmitting device (e.g., wireless device 202) first transmits a preamble, then transmits a delimiter (D), and then transmits left and right channel data. In particular, in this example the transmitting device transmits a single preamble and delimiter, and then transmits the left and right channel data concurrently.

In some aspects, the transmitting device may transmit the left channel data in synchronization with the right channel data. In some cases the transmitting device may multicast each channel to all of the receiving devices in the system (e.g., wireless devices 204 and 206). In some cases the transmitting device may send one channel to one device (e.g., wireless device 204) and the other channel to another device (e.g., wireless device 206). In various implementations the data streams associated with the channels may comprise data packets, overlapping orthogonal code signals, overlapping pseudo-orthogonal code signals, packets transmitted back-to-back, or some other suitable data format.

The receiving devices are configured to acquire the preamble and the delimiter sent by the transmitting device, as well as one of the data channels sent by the transmitting device. This is illustrated in a simplifier manner in FIG. 3 where a right channel receiving device receives the preamble, then the delimiter, and then the right channel data. Similarly, a left channel receiving device receives the preamble, then the delimiter, and then the left channel data.

A portion of the signal transmitted by the transmitting device may be designated as a synchronization signal. For example, a synchronization signal may be defined as one or more of: a portion of a preamble, a delimiter, an independently coded signal, or some other suitable signal.

In the example of FIG. 3 it is assumed that the delimiter is defined as a synchronization signal. In this case, each receiving device is configured to record (e.g., timestamp) the time at which the synchronization signal is received at that receiving device. For example, the right channel receiving device may generate a timestamp at a time corresponding to the dashed line 302 and the left channel receiving device may generate a timestamp at a time corresponding to the dashed line 304. Here, it should be appreciated that in cases where the receiving devices are relatively close to one another (e.g., on the order of tens of meters or less), the receiving devices may receive the synchronization signal at approximately the same time (e.g., the difference between the times of receipt is on the order of tens of nanoseconds or less). Accordingly, the synchronization signal may provide a common point in time reference for the receiving devices.

As discussed herein, the system 200 may employ a latency interval that is used to determine when the receiving devices process received data. Here, the processing of data may involve one or more of various operations such as operating on the data, outputting the data, rendering the data, invoking an operation, and so on. For example, at a given point in time data processing operations (e.g., application layer processing) at the right channel receiving device may take longer than similar processing operations at the left channel receiving device. In such a case it is desirable to have one or both of the receiving devices delay the processing of received data so that both receiving devices may process the received data in a synchronous manner.

FIG. 3 illustrates an example where the receiving devices process received data at substantially the same time. As represented by the lines 306 and 308, respectively, each receiving device may delay some aspect of processing the received data by a period of time (e.g., corresponding to the latency interval). For example, in the event the receiving devices are configured to output an audio signal at approximately the same time, each receiving device may temporarily buffer the received data and then provide the buffered data to a speaker circuit at the designated time. Here, it should be appreciated that the received data may be processed in some way by the receiving device after it is received but before it is subjected to the latency controlled processing (e.g., output processing). For example, the receiving device may process received information (e.g., coded information) upon receipt of the information and store the processed information (e.g., audio data) in memory. The receiving device may then wait for a pre-specified latency, after which it further processes the information (e.g., renders the audio data to speakers).

In some cases the receiving devices may be configured to process data in a synchronous manner, but not at the same time. Here, it may be desired for one receiving device to process data (e.g., generate an output signal) a defined period of time after the other receiving device processes its data. In such a case, different synchronization signals and/or different latency intervals may be defined for the different receiving devices. For example, in a case employing multiple synchronization signals, the transmitting device may send a first synchronization signal to one receiving device at a given point in time and send a second synchronization signal to the other receiving device at a later point in time. The receiving devices may then use the same or different latency interval to process the received data at the desired relative times. Conversely, in a case employing a single synchronization signal, the transmitting device may send a common synchronization signal to both receiving devices, but the receiving devices may use different latency intervals to process the received data at the desired relative times.

Figure 4:
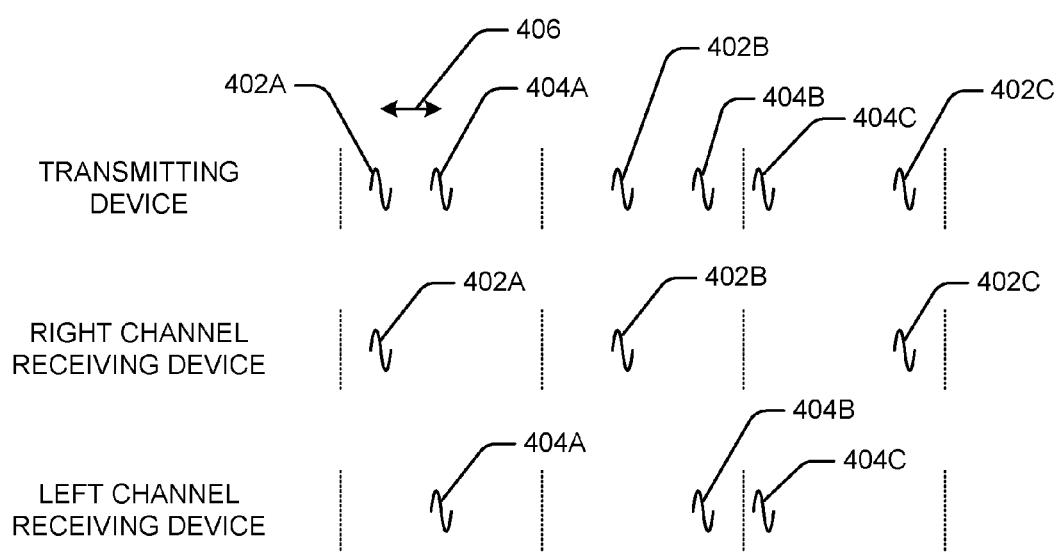
FIG. 4 is a simplified diagram illustrating sample channel signaling.

As mentioned above, in some cases the transmitting device may transmit data for different channels in a concurrent manner. FIG. 4 illustrates a simplified example of how this may be accomplished in a pulse-based communication system. Here, the transmitting device transmits a stream of data via a series of time-hopping pulses that are separated in time according to a specified duty cycle. Such a scheme may be used, for example, in a UWB system. The transmitting device transmits data associated with the right channel as indicated by the pulses 402A, 402B, and 402C. In addition, the transmitting device transmits data associated with the left channel as indicated by the pulses 404A, 404B, and 404C.

In this example, as indicated by the time hopping offset 406, the pulses associated with the left channel are transmitted according to a time hopping sequence that is offset in time from the time hopping sequence of the pulses associated with the right channel. Thus, the transmitting device may send one or more pulses for the left channel, then send one or more pulses for the right channel, then send one or more pulses for the left channel, and so on.

As described above, each receiving device may be configured to recover the pulses associated with one of the channels. Continuing with the above example, a right channel receiving device may be configured to receive the pulses 402A, 402B, and 402C based on a time hoping sequence offset associated with these pulses while a left channel receiving device may be configured to receive the pulses 404A, 404B, and 404C based on a time hopping sequence offset associated with these pulses.

It should be appreciated that the communication channels for transmitting data may be defined in various ways. For example, a communication channel for transmitting right channel data may be defined based on one time hopping sequence and a communication channel for transmitting left channel data may be defined based on a different time hopping sequence. Similarly, a communication channel for transmitting right channel data may be defined based on one form of communication coding and a communication channel for transmitting left channel data may be defined based on a different form of communication coding.

It also should be appreciated that substantially concurrent transmission may be accomplished in various ways. For example, concurrent channels may be transmitted through the use of different coding schemes for each channel. Also, a transmitting device may incorporate multiple transmitter elements that may transmit different signals at the same time.

With the above in mind, sample operations that may be performed by a system such as the system 200 will be described in more detail in conjunction with the flowcharts of FIGS. 5 and 6. For illustration purposes, the operations of FIGS. 5 and 6 (or any other operations discussed or taught herein) may be performed by specific components (e.g., corresponding components depicted in one or more of FIGS. 1, 2 and 7). It should be appreciated, however, that these operations may be performed by other types of components and may be performed using a different number of components. It also should be appreciated that one or more of the operations described herein may not be employed in a given implementation.

Figure 5:
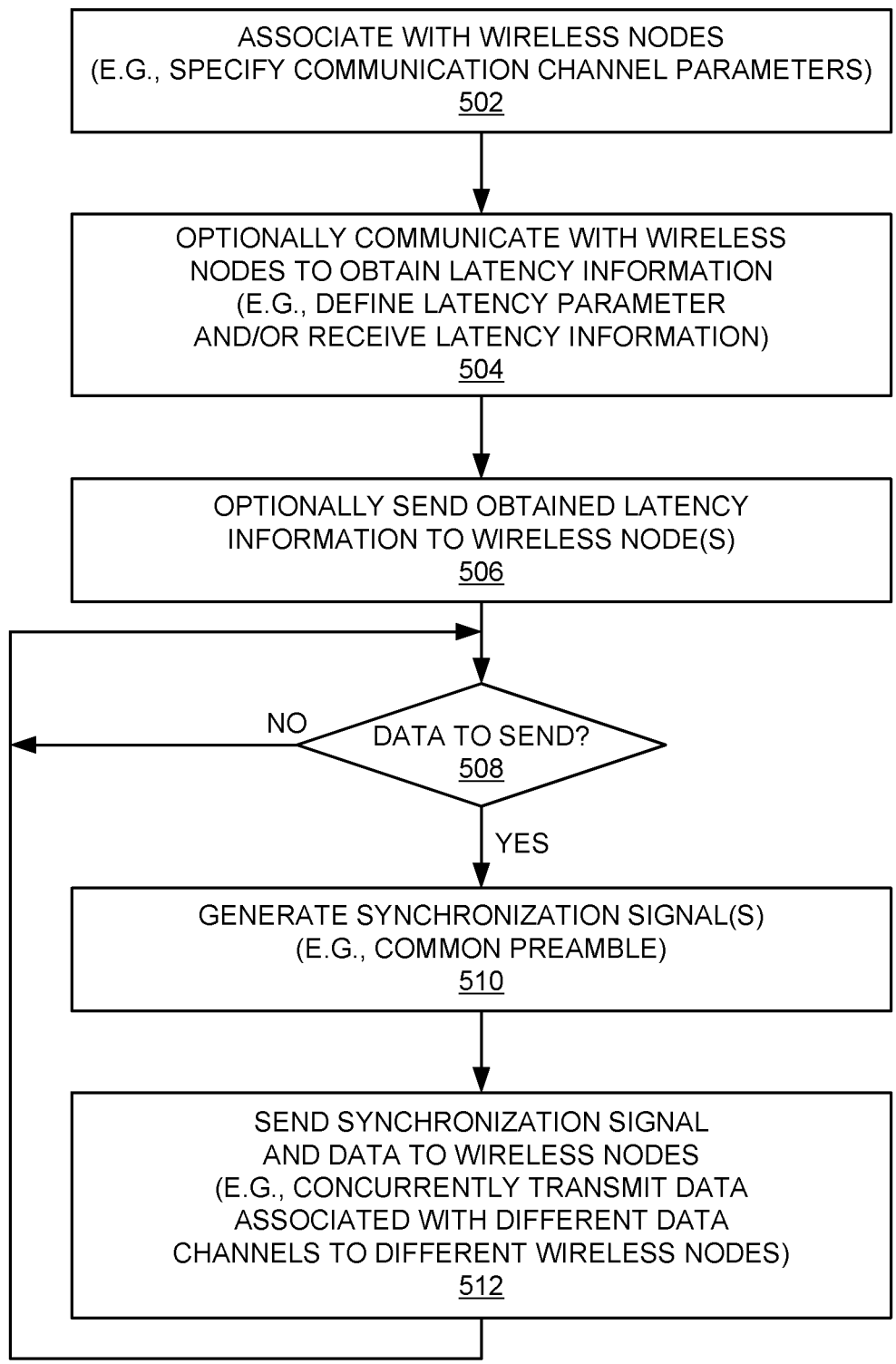
FIG. 5 is a flowchart of several sample aspects of operations that may be performed by a transmitting node.
Figure 7:
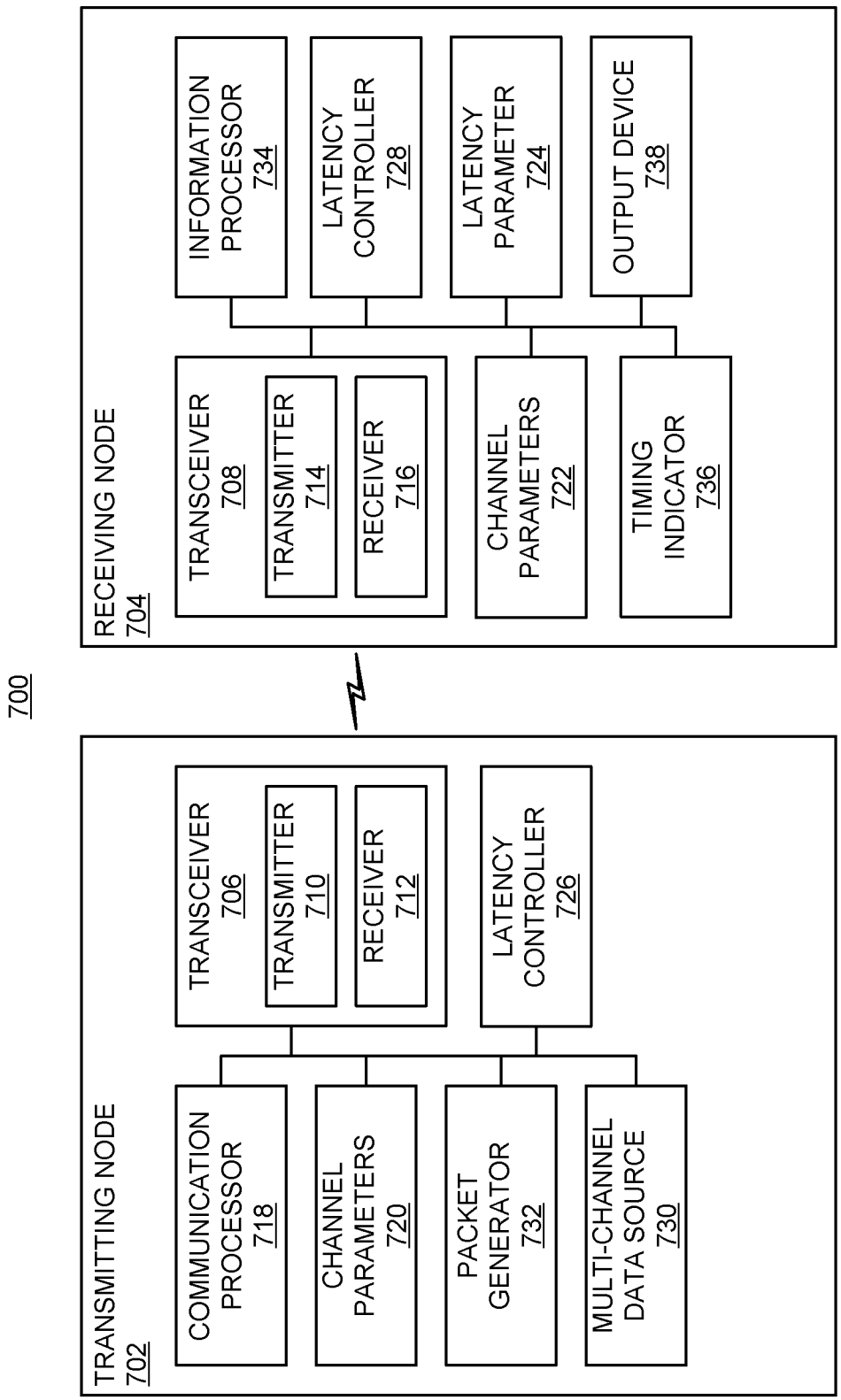
FIG. 7 is a simplified block diagram illustrating several components of a sample communication system.

FIG. 5 illustrates several operations that may be performed by a wireless transmitting node 702 as shown in FIG. 7 that sends information to several wireless receiving nodes (e.g., receiving node 704). In some aspects, the transmitting node 702 may be similar to the data source 102 of FIG. 1 and/or the wireless device 202 of FIG. 2. In addition, the receiving device 704 may be similar to one of the data sinks 104 or 106 of FIG. 1 and/or one of the wireless devices 204 or 206 of FIG. 2.

The terms transmitting node and receiving node are used herein for convenience to refer to nodes that respectively transmit and receive a synchronization signal as taught herein. These terms do not imply that the nodes are not capable of both transmitting and receiving. For example, in practice the transmitting node 702 and the receiving node 704 may include a transceiver 706 and a transceiver 708, respectively, for communicating with one another and with other nodes. The transceiver 706 includes a transmitter 710 for sending signals (e.g., multi-channel data and synchronization signals) and a receiver 712 for receiving signals. Similarly, the transceiver 708 includes a transmitter 714 for sending signals and a receiver 716 for receiving signals (e.g., channel data and synchronization signals).

As represented by block 502 of FIG. 5, at some point in time the transmitting node 702 associates with several receiving nodes. For example, a user may pair a wireless handset (e.g., transmitting node 702) with a pair of wireless earpieces (e.g., one of which may be the receiving node 704) by initially establishing communication over a known communication channel. In conjunction with this operation, one or more communication channels may be established for subsequent communication between the transmitting node 702 and the receiving nodes. In some implementations such a communication channel may comprise an asynchronous channel. In some cases the transmitting node 702 may communicate with all receiving nodes via a single communication channel while in other cases the transmitting node 702 may communicate with different receiving nodes via different communication channels.

The transmitting node 702 (e.g., a communication processor 718) may define a channel by specifying communication channel parameters 720 and 722 for that channel and/or by negotiating with a receiving node to select channel parameters. As mentioned above, the channel parameters 720 and 722 may include a time hopping sequence, a time hopping sequence offset, communication coding, or some other suitable parameter(s).

As discussed herein, at some point in time a latency parameter that specifies timing for one or more receiving nodes is obtained. In some implementations a latency parameter may be preconfigured (e.g., loaded into a receiving device upon deployment). Block 504 of FIG. 5 illustrates an example where the transmitting node 702 (e.g., the communication processor 718) communicates with the receiving nodes to obtain one or more latency parameters. The transmitting node 702 (e.g., a latency controller 726) may define a single latency parameter for multiple receiving nodes or may define different latency parameters for different receiving nodes as discussed herein.

In some cases the latency controller 726 may negotiate with the latency controllers (e.g., a latency controller 728) of the receiving nodes to define a latency parameter. For example, each latency controller of a receiving node may send information indicative of a processing delay of that receiving node to the latency controller 726. In some aspects, this processing delay information may relate to a processing latency time that is achievable by the receiving node. Based on this information, the latency controller 726 may define a latency parameter to ensure that the processing operations of the receiving nodes are synchronized. As a simplified example, if the receiving device 704 (e.g., an information processor 734) may take up to 4 µs to process received information and another receiving device (not shown in FIG. 7) may take up to 3 µs to process received information, the latency controller 726 may define a latency parameter of 5 µs for both receiving devices. As will be described below in conjunction with FIG. 6, both receiving devices may then delay outputting their respective processed information until 5 µs after receiving a synchronization signal. In this way, it may be ensured that both receiving devices are ready to output their respective processed information at this time.

Accordingly, as represented by block 506, the transmitting device 702 may send the defined latency parameter(s) to the receiving nodes. As mentioned above, in some cases the same latency parameter may be sent to each receiving node while in other cases different latency parameters may be set to different nodes. The example of FIG. 7 illustrates that the receiving device 704 maintains its latency parameter 724.

As represented by block 508, at some point in time the transmitting device 702 will have data that needs to be sent to the receiving nodes. For example, a multi-channel source 730 may generate multi-channel data or may provide multi-channel data that was received from another source. In some cases, this data may be packetized by a packet generator 732 for transmission over-the-air.

In some cases the transmitting node 702 (e.g., the multi-channel source 730) may aggregate multiple streams prior to transmitting the streams to multiple receiving nodes. In a stereo playback application, for example, this may be trivial if the multiple streams are generated with negligible skew between different streams. When there is variable processing delay (jitter) between different streams at the transmitting node 702, however, the transmitting node 702 (e.g., the data source 730) may employ de-jitter buffers to synchronize the streams and transmit them to multiple receiving nodes.

As represented by block 510, the transmitting node 702 (e.g., the packet generator 732) generates one or more synchronization signals to be sent to one or more receiving nodes. As mentioned above, this synchronization signal may comprise or be incorporated into a preamble, a delimiter, or implemented in some other way.

As represented by block 512, the transmitting node 702 (e.g., the transmitter 710) sends the synchronization signal and the data to the receiving nodes. The synchronization signal and the data may be sent at various times. FIG. 3 described above illustrates an example where the transmitter 710 may send a synchronization signal prior to transmission of associated data (e.g., the payload portion of a packet). In other cases, the synchronization signal may be sent with or following associated data.

As mentioned above, the transmitting node 702 (e.g., the transmitter 710) may concurrently transmit data (e.g., packets) associated with different channels to different receiving nodes. For example, the transmitting node 702 may transmit a portion of a first packet (e.g., one or more pulses) for a first channel, then transmit a portion of a second packet (e.g., one or more pulses) for a second channel, transmit at least another portion of the first packet, and so on. The transmitting node 702 may send the data for multiple channels (e.g., audio channels) over a single communication channel or multiple communication channels.

Figure 6:
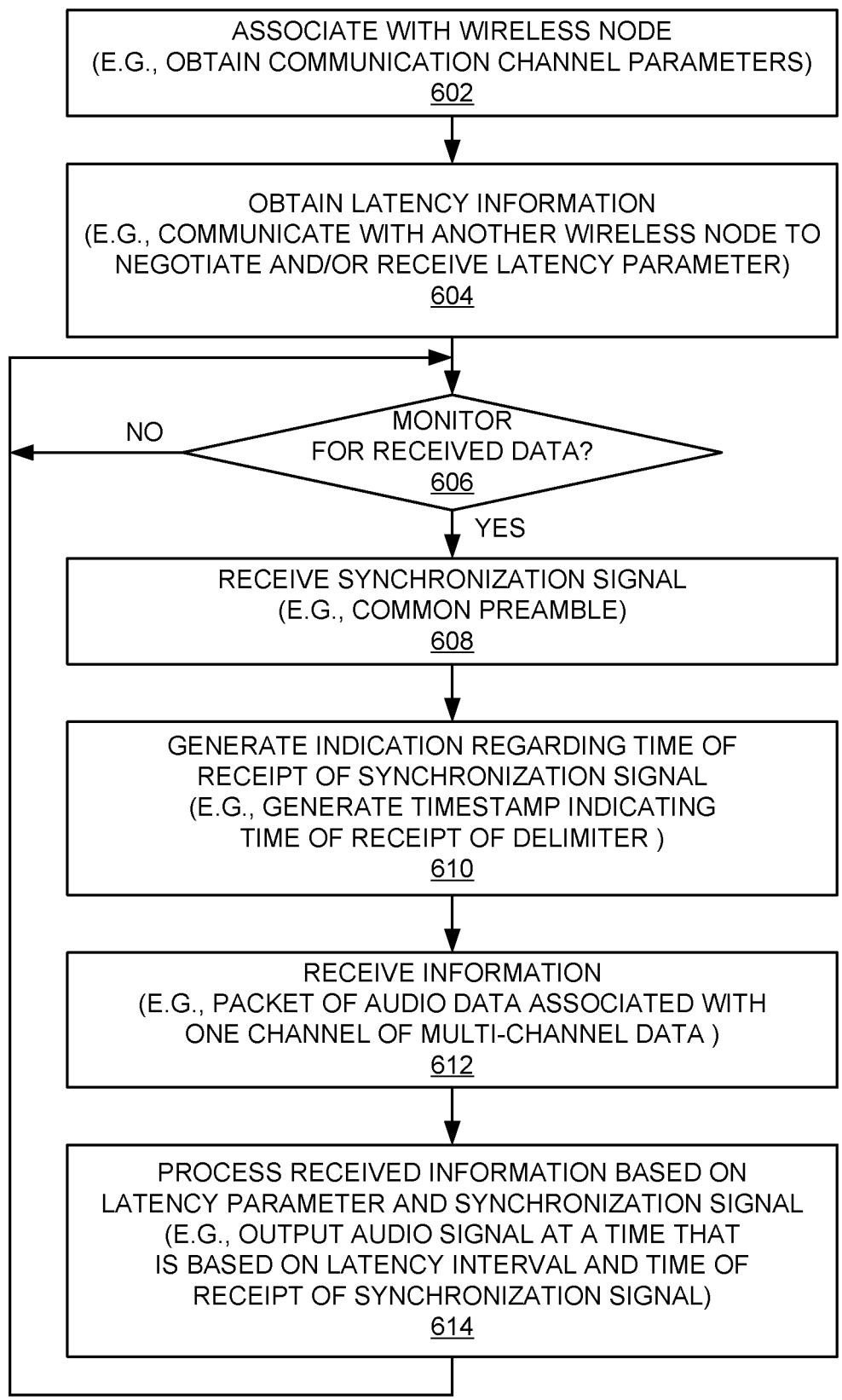
FIG. 6 is a flowchart of several sample aspects of operations that may be performed by a receiving node.

Referring now to FIG. 6, several samples operations that may be performed by a node such as the receiving node 704 will be described. In some aspects, these operations are complementary to the operations of FIG. 5.

As represented by block 602, at some point in time the receiving node 704 associates with a transmitting node whereby one or more communication channels are defined. These operations may thus be complementary to the operations of block 502 described above.

As represented by block 604, the receiving node 704 (e.g., the latency controller 728) obtains latency information. As mentioned above, latency information may be obtained in various ways. For example, in some cases the latency parameter 724 used by the receiving node 704 is preconfigured parameter. In some cases the latency parameter 724 is acquired during setup of a channel (e.g., at block 602). In some cases the latency parameter 724 is acquired via a back channel. In some cases the latency parameter 724 is received via a synchronization signal. In some cases the receiving nodes in a system may communicate (e.g., negotiate) to define one or more latency parameter(s).

In some cases the receiving node 704 may negotiate with the transmitting device 702 to obtain the latency parameter. For example, the latency controller 728 may determine a latency processing time that is achievable by the receiving node 704 (e.g., by the information processor 734). The latency controller 728 then cooperates with the transmitter 712 to send this information to the transmitting node 702. In response, the latency controller 728 may receive the latency parameter 724 from the latency controller 726.

As represented by block 606, at some point in time the receiving node 704 monitors the channel or channels defined at block 602 for signals transmitted by the transmitting node 702. For example, in a case where the receiving node 704 is receiving periodic data (e.g., VoIP), the receiver 716 may be configured to scan for incoming signals at defined intervals.

As represented by block 608, at some point in time the receiving node 704 will receive a synchronization signal from the transmitting node 702. For example, as discussed above the synchronization signal may take the form of a common signal that is sent to all receiving devices or a signal directed specifically to the receiving node 704.

As represented by block 610, the receiving node 704 (e.g., a timing indicator 736) may then generate an indication relating to the time of receipt of the synchronization signal. For example, the timing indicator 736 may generate a timestamp that indicates the time at which a specified delimiter is received from the transmitting node 702. In addition, other receiving devices in the system 700 (not shown in FIG. 7) will perform a similar operation as described herein.

As represented by block 612, the receiving node 704 also receives data from the transmitting node 702 in conjunction with the receipt of the synchronization signal. As above, the data may be received after, before, or concurrently with the synchronization signal. Here, the receiver 716 may be configured to decode one channel of the multi-channel data transmitted by the transmitting node 702 while another receiving device in the system 700 (not shown in FIG. 7) may decode another channel of the multi-channel data transmitted by the transmitting node 702.

As represented by block 614, the receiving node 704 (e.g., the information processor 734) processes the received data in accordance with the requirements of the corresponding application. For example, for the case of audio data, the information processor 724 may generate a sigma-delta modulated ("SDM") signal stream or some other suitable data stream to be output by an output device 738 (e.g., a speaker).

In accordance with the teachings herein, at least a portion of the processing performed by the receiving node 704 (e.g., the information processor 734) may be based on the latency parameter 724 and the time of receipt of the synchronization signal. As an example, in the case of a received synchronous data stream data, the information processor 734 may generate an output data stream delayed an amount of time based on the latency interval after the receipt of the synchronization signal. As another example, in the case of received audio data, the information processor 734 may provide an audio signal (e.g., an SDM data stream) to the output device 728 at a point in time that corresponds the time of receipt of the synchronization signal plus the latency interval. Here, the information processor 734 may delay the generation of the audio output signal for an amount of time specified by a delay period where the delay period is based on the latency interval and signal processing time of the receiving node 702 (e.g., the time it takes to process the received data is subtracted from the latency interval to derive the delay period).

Another receiving node (not shown in FIG. 7) may perform similar operations on other channel data and a synchronization signal that it receives from the transmitting node 702. In this way, the processing times of the receiving nodes may be substantially concurrent, may differ by a defined timing offset (e.g., in the case of two receiving nodes), or may differ by more than one defined timing offset (in the case of more than two receiving nodes).

The teachings herein may be implemented in various ways. For example, the teachings herein may be employed in a multi-channel audio system (e.g., 5.1 or 7.1 audio) that includes wireless speakers. The teachings herein may be employed in a control system employing wireless components (e.g., to activate different components at the same time or different times). The teachings herein may be employed in a sensor system employing wireless components (e.g., to sense different conditions at the same time or different times). The teachings herein may be employed in a system that sends one preamble to indicate first channel data and sends another preamble to indicate second channel data, where the latency parameter is defined with respect to the two different channels. The teachings herein may be employed in a system where multiple components that receive the synchronization signal(s) and associated information are implemented on different integrated circuits or the same integrated circuit (e.g., a headset that employs a single receiver chip that is connected to the headset earpieces via wires).

Figure 8:
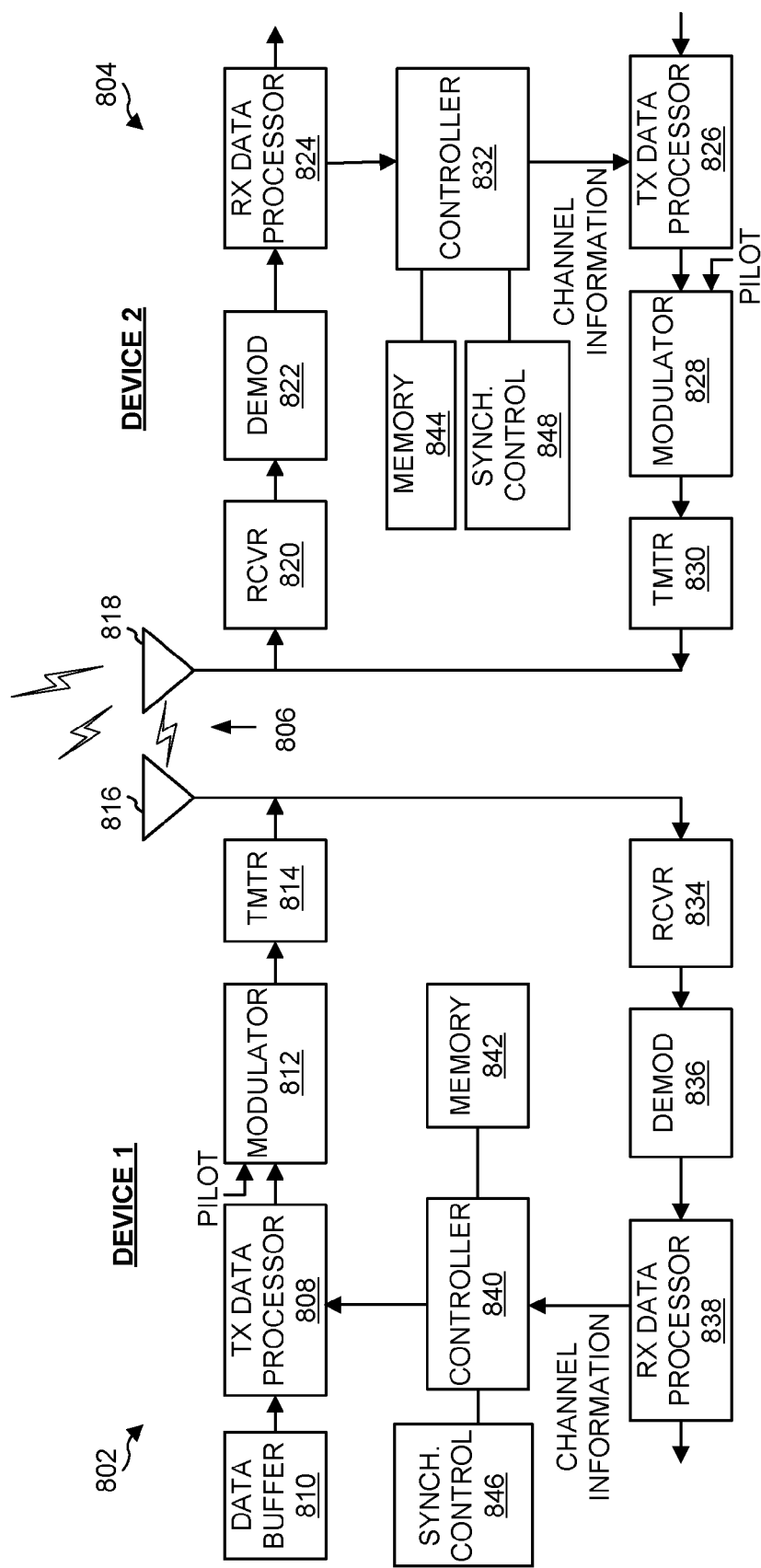
FIG. 8 is a simplified block diagram of several sample aspects of communication components.

The teachings herein may be incorporated into a device employing various components for communicating with at least one other device. FIG. 8 depicts several sample components that may be employed to facilitate communication between devices. Here, a first device 802 and a second device 804 are adapted to communicate via a wireless communication link 806 over a suitable medium.

Initially, components involved in sending information from the device 802 to the device 804 (e.g., a reverse link) will be treated. A transmit ("TX") data processor 808 receives traffic data (e.g., data packets) from a data buffer 810 or some other suitable component. The transmit data processor 808 processes (e.g., encodes, interleaves, and symbol maps) each data packet based on a selected coding and modulation scheme, and provides data symbols. In general, a data symbol is a modulation symbol for data, and a pilot symbol is a modulation symbol for a pilot (which is known a priori). A modulator 812 receives the data symbols, pilot symbols, and possibly signaling for the reverse link, and performs modulation (e.g., OFDM or some other suitable modulation) and/or other processing as specified by the system, and provides a stream of output chips. A transmitter ("TMTR") 814 processes (e.g., converts to analog, filters, amplifies, and frequency upconverts) the output chip stream and generates a modulated signal, which is then transmitted from an antenna 816.

The modulated signals transmitted by the device 802 (along with signals from other devices in communication with the device 804) are received by an antenna 818 of the device 804. A receiver ("RCVR") 820 processes (e.g., conditions and digitizes) the received signal from the antenna 818 and provides received samples. A demodulator ("DEMOD") 822 processes (e.g., demodulates and detects) the received samples and provides detected data symbols, which may be a noisy estimate of the data symbols transmitted to the device 804 by the other device(s). A receive ("RX") data processor 824 processes (e.g., symbol demaps, deinterleaves, and decodes) the detected data symbols and provides decoded data associated with each transmitting device (e.g., device 802).

Components involved in sending information from the device 804 to the device 802 (e.g., a forward link) will be now be treated. At the device 804, traffic data is processed by a transmit ("TX") data processor 826 to generate data symbols. A modulator 828 receives the data symbols, pilot symbols, and signaling for the forward link, performs modulation (e.g., OFDM or some other suitable modulation) and/or other pertinent processing, and provides an output chip stream, which is further conditioned by a transmitter ("TMTR") 830 and transmitted from the antenna 818. In some implementations signaling for the forward link may include power control commands and other information (e.g., relating to a communication channel) generated by a controller 832 for all devices (e.g. terminals) transmitting on the reverse link to the device 804.

At the device 802, the modulated signal transmitted by the device 804 is received by the antenna 816, conditioned and digitized by a receiver ("RCVR") 834, and processed by a demodulator ("DEMOD") 836 to obtain detected data symbols. A receive ("RX") data processor 838 processes the detected data symbols and provides decoded data for the device 802 and the forward link signaling. A controller 840 receives power control commands and other information to control data transmission and to control transmit power on the reverse link to the device 804.

The controllers 840 and 832 direct various operations of the device 802 and the device 804, respectively. For example, a controller may determine an appropriate filter, reporting information about the filter, and decode information using a filter. Data memories 842 and 844 may store program codes and data used by the controllers 840 and 832, respectively.

FIG. 8 also illustrates that the communication components may include one or more components that perform synchronization control operations as taught herein. For example, a synchronization ("SYNCH.") control component 846 may cooperate with the controller 840 and/or other components of the device 802 to send/receive information to/from another device (e.g., device 804). Similarly, a synchronization control component 848 may cooperate with the controller 832 and/or other components of the device 804 to send/receive information to/from another device (e.g., device 802). It should be appreciated that for each device 802 and 804 the functionality of two or more of the described components may be provided by a single component. For example, a single processing component may provide functionality of the synchronization control component 846 and the controller 840 and a single processing component may provide functionality of the synchronization control component 848 and the controller 832.

A wireless node (e.g., a wireless device) may include various components that perform functions based on signals (e.g., comprising information such as data) that are transmitted by or received at the wireless node (e.g., via a transmitter or receiver). For example, a wireless headset may include a transducer configured to provide an audio output based on the information or provide an audio output that associated with (e.g., based on or used to control transmission of) data that is transmitted in conjunction with a synchronization signal. A wireless watch may include a user interface configured to provide an indication based on the information or provide an indication that associated with (e.g., based on or used to control transmission of) data that is transmitted in conjunction with a synchronization signal. A wireless sensing device may include a sensor configured to sense based on the information (e.g., based on a request included in the information) or configured to provide data that is transmitted in conjunction with a synchronization signal.

A wireless node may communicate via one or more wireless communication links that are based on or otherwise support any suitable wireless communication technology. For example, in some aspects a wireless node may associate with a network. In some aspects the network may comprise a personal area network (e.g., supporting a wireless coverage area on the order of 30 meters) or a body area network (e.g., supporting a wireless coverage area on the order of 10 meters) implemented using ultra-wideband technology or some other suitable technology. In some aspects the network may comprise a local area network or a wide area network. A wireless node may support or otherwise use one or more of a variety of wireless communication technologies, protocols, or standards such as, for example, CDMA, TDMA, OFDM, OFDMA, WiMAX, and Wi-Fi. Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a device may comprise a wireless transceiver with associated transmitter and receiver components that may include various components (e.g., signal generators and signal processors) that facilitate communication over a wireless medium.

In some aspects a wireless node may communicate via an impulse-based wireless communication link. For example, an impulse-based wireless communication link may utilize ultra-wideband pulses that have a relatively short length (e.g., on the order of a few nanoseconds or less) and a relatively wide bandwidth. In some aspects the ultra-wideband pulses may have a fractional bandwidth on the order of approximately 20% or more and/or have a bandwidth on the order of approximately 500 MHz or more.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a medical sensing device (e.g., a biometric sensor, a heart rate monitor, a pedometer, an EKG device, a smart bandage, etc.), a user I/O device (e.g., a watch, a remote control, a light switch, a keyboard, a mouse, etc.), an environment sensing device (e.g., a tire pressure monitor), a computer, a point-of-sale device, an entertainment device, a hearing aid, a set-top box, or any other suitable device.

These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

In some aspects a wireless node may comprise an access device (e.g., an access point) for a communication system. Such an access device may provide, for example, connectivity to another network (e.g., a wide area network such as the Internet or a cellular network) via a wired or wireless communication link. Accordingly, the access device may enable another device (e.g., a wireless station) to access the other network or some other functionality. In addition, it should be appreciated that one or both of the devices may be portable or, in some cases, relatively non-portable. Also, it should be appreciated that a wireless node also may be capable of transmitting and/or receiving information in a non-wireless manner (e.g., via a wired connection) via an appropriate communication interface.

Figure 9:
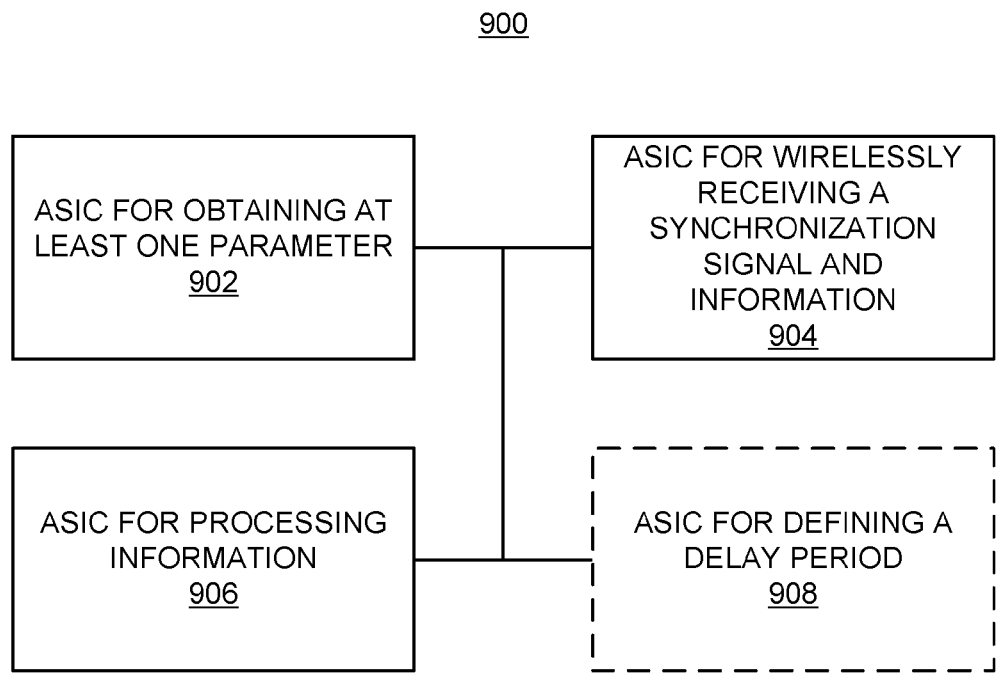
FIGS. 9 and 10 are simplified block diagrams of several sample aspects of apparatuses configured to provide synchronization as taught herein.
Figure 10:
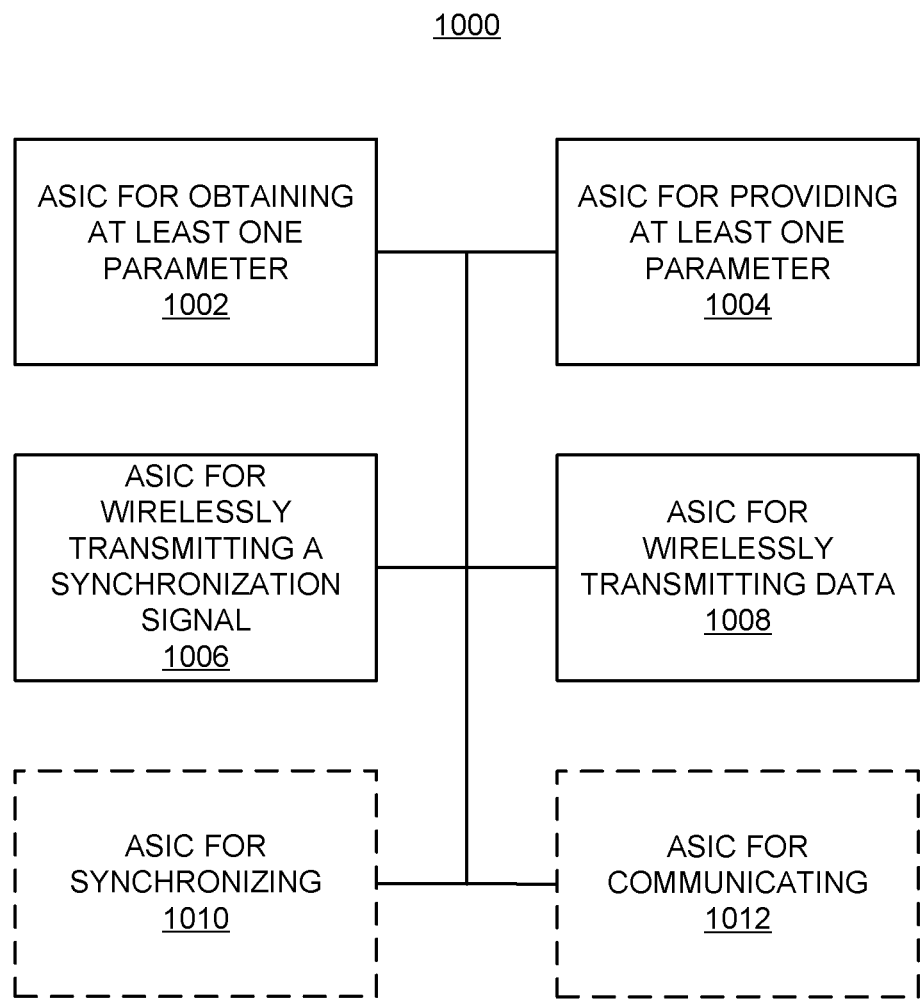

The components described herein may be implemented in a variety of ways. Referring to FIGS. 9 and 10, apparatuses 900 and 1000 are represented as a series of interrelated functional blocks that may represent functions implemented by, for example, one or more integrated circuits (e.g., an ASIC) or may be implemented in some other manner as taught herein. As discussed herein, an integrated circuit may include a processor, software, other components, or some combination thereof.

The apparatuses 900 and 1000 may include one or more modules that may perform one or more of the functions described above with regard to various figures. For example, an ASIC for obtaining at least one parameter 902 may correspond to, for example, a latency controller as discussed herein. An ASIC for wirelessly receiving a synchronization signal and information 904 may correspond to, for example, a receiver as discussed herein. An ASIC for processing information 906 may correspond to, for example, an information processor as discussed herein. An ASIC for defining a delay period 908 may correspond to, for example, an information processor as discussed herein. An ASIC for obtaining at least one parameter 1002 may correspond to, for example, a latency controller as discussed herein. An ASIC for providing at least one parameter 1004 may correspond to, for example, a latency controller as discussed herein. An ASIC for wirelessly transmitting a synchronization signal 1006 may correspond to, for example, a transmitter as discussed herein. An ASIC for wirelessly transmitting data 1008 may correspond to, for example, a transmitter as discussed herein. An ASIC for synchronizing 1010 may correspond to, for example, a multi-channel source as discussed herein. An ASIC for communicating 1012 may correspond to, for example, communication processor as discussed herein.

As noted above, in some aspects these components may be implemented via appropriate processor components. These processor components may in some aspects be implemented, at least in part, using structure as taught herein. In some aspects a processor may be adapted to implement a portion or all of the functionality of one or more of these components. In some aspects one or more of the components represented by dashed boxes are optional.

As noted above, the apparatuses 900 and 1000 may comprise one or more integrated circuits. For example, in some aspects a single integrated circuit may implement the functionality of one or more of the illustrated components, while in other aspects more than one integrated circuit may implement the functionality of one or more of the illustrated components.

In addition, the components and functions represented by FIGS. 9 and 10 as well as other components and functions described herein, may be implemented using any suitable means. Such means also may be implemented, at least in part, using corresponding structure as taught herein. For example, the components described above in conjunction with the "ASIC for" components of FIGS. 9 and 10 also may correspond to similarly designated "means for" functionality. Thus, in some aspects one or more of such means may be implemented using one or more of processor components, integrated circuits, or other suitable structure as taught herein.

Also, it should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination thereof."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of wireless communication, comprising:
    obtaining, at a data sink, at least one parameter from a data source that specifies timing for the data sink and one or more other data sinks to process information after receipt of a synchronization signal, wherein the at least one parameter is based on latencies associated with processing the information at the data sink and at the one or more other data sinks, respectively;
    wirelessly receiving, at the data sink, the synchronization signal from the data source;
    wirelessly receiving, at the data sink, the information from the data source; and
    processing, at the data sink, the information at a time based on the at least one parameter and the synchronization signal.

2. The method of claim 1, wherein:
    the at least one parameter specifies a latency interval; and
    the time at which the information is processed is based on the latency interval and a receipt time associated with the receipt of the synchronization signal.

3. The method of claim 1, wherein the synchronization signal comprises at least one of: a preamble of a packet including the information, a delimiter following the preamble, or an independently coded signal.

4. The method of claim 1, wherein:
    the information comprises data or control information; and
    the processing of the information comprises outputting a signal or invoking a control operation.

5. The method of claim 1, wherein the information comprises audio data, video data, sensor data, or gaming data.

6. The method of claim 1, wherein the obtaining of the at least one parameter comprises wirelessly receiving the at least one parameter.

7. The method of claim 6, wherein the data source consists of a single wireless node.

8. The method of claim 1, wherein the obtaining of the at least one parameter comprises negotiating with the data source to define the at least one parameter.

9. The method of claim 1, wherein the at least one parameter is received via the synchronization signal, is acquired during setup of a channel, or is acquired via a back channel.

10. The method of claim 1, wherein:
the at least one parameter specifies a latency interval;
the information comprises a synchronous data stream associated with one channel of a multi-channel data stream; and
the processing of the information comprises generating, based on the synchronous data stream, an output data stream delayed an amount of time based on the latency interval after receipt of the synchronization signal.

11. The method of claim 1, wherein:
the at least one parameter specifies a latency interval;
the information comprises audio data associated with one channel of a multi-channel audio stream; and
the processing of the information comprises generating, based on the audio data, an audio signal delayed an amount of time based on the latency interval after receipt of the synchronization signal.

12. The method of claim 11, wherein:
the information is received via a data packet; and
the synchronization signal comprises a preamble of the packet or a delimiter of the packet.

13. The method of claim 11, further comprising defining a delay period based on the specified latency interval and a duration of the processing of the information, wherein the processing of the information comprises delaying the generation of the audio signal for an amount of time specified by the delay period.

14. The method of claim 1, wherein:
the synchronization signal comprises timing information for specifying processing times for the data sink and the one or more other data sinks; and
the time at which the information is processed comprises one of the processing times.

15. The method of claim 14, wherein the data sink and the one or more other data sinks comprise physically separate wireless nodes.

16. The method of claim 14, wherein the processing times are substantially concurrent or differ by at least one defined timing offset.

17. The method of claim 14, wherein:
the information comprises at least a portion of a set of data destined for the data sink and the one or more other data sinks; and
the set of data comprises data packets, overlapping orthogonal code signals, overlapping pseudo-orthogonal code signals, or packets transmitted back-to-back.

18. The method of claim 14, wherein the at least one parameter comprises at least a portion of a set of parameters for specifying the processing times for the data sink and the one or more other data sinks.

19. The method of claim 14, wherein:
the information relates to a dual-channel audio stream;
the data sink and the one or more other data sinks comprise a first wireless earpiece and a second wireless earpiece; and
the processing times comprise times that the first and second wireless earpieces output audio signals based on the dual-channel audio stream.

20. An apparatus for wireless communication, comprising:
means for obtaining at least one parameter from a data source that specifies timing for the apparatus and one or more data sinks to process information after receipt of a synchronization signal, wherein the at least one parameter is based on latencies associated with processing the information at the apparatus and at the one or more data sinks, respectively;
means for wirelessly receiving the synchronization signal and the information from the data source; and
means for processing the information at a time based on the at least one parameter and the synchronization signal.

21. The apparatus of claim 20, wherein:
the at least one parameter specifies a latency interval; and
the time at which the information is processed is based on the latency interval and a receipt time associated with the receipt of the synchronization signal.

22. The apparatus of claim 20, wherein the synchronization signal comprises at least one of: a preamble of a packet including the information, a delimiter following the preamble, or an independently coded signal.

23. The apparatus of claim 20, wherein:
the information comprises data or control information; and
the processing of the information comprises outputting a signal or invoking a control operation.

24. The apparatus of claim 20, wherein the information comprises audio data, video data, sensor data, or gaming data.

25. The apparatus of claim 20, wherein the obtaining of the at least one parameter comprises wirelessly receiving the at least one parameter.

26. The apparatus of claim 25, wherein the data source consists of a single wireless node.

27. The apparatus of claim 20, wherein the obtaining of the at least one parameter comprises negotiating with the data source to define the at least one parameter.

28. The apparatus of claim 20, wherein the at least one parameter is received via the synchronization signal, is acquired during setup of a channel, or is acquired via a back channel.

29. The apparatus of claim 20, wherein:
the at least one parameter specifies a latency interval;
the information comprises a synchronous data stream associated with one channel of a multi-channel data stream; and
the processing of the information comprises generating, based on the synchronous data stream, an output data stream delayed an amount of time based on the latency interval after receipt of the synchronization signal.

30. The apparatus of claim 20, wherein:
the at least one parameter specifies a latency interval;
the information comprises audio data associated with one channel of a multi-channel audio stream; and
the processing of the information comprises generating, based on the audio data, an audio signal delayed an amount of time based on the latency interval after receipt of the synchronization signal.

31. The apparatus of claim 30, wherein:
the information is received via a data packet; and
the synchronization signal comprises a preamble of the packet or a delimiter of the packet.

32. The apparatus of claim 30, further comprising means for defining a delay period based on the specified latency interval and a duration of the processing of the information, wherein the processing of the information comprises delaying the generation of the audio signal for an amount of time specified by the delay period.

33. The apparatus of claim 20, wherein:
the synchronization signal comprises timing information for specifying processing times for the apparatus and the one or more data sinks; and
the time at which the information is processed comprises one of the processing times.

34. The apparatus of claim 33, wherein the apparatus and the one or more data sinks comprise physically separate wireless nodes.

35. The apparatus of claim 33, wherein the processing times are substantially concurrent or differ by at least one defined timing offset.

36. The apparatus of claim 33, wherein:
the information comprises at least a portion of a set of data destined for the apparatus and the one or more data sinks; and
the set of data comprises data packets, overlapping orthogonal code signals, overlapping pseudo-orthogonal code signals, or packets transmitted back-to-back.

37. The apparatus of claim 33, wherein the at least one parameter comprises at least a portion of a set of parameters for specifying the processing times for the apparatus and the one or more data sinks.

38. The apparatus of claim 33, wherein:
the information relates to a dual-channel audio stream;
the apparatus and the one or more data sinks comprise a first wireless earpiece and a second wireless earpiece; and
the processing times comprise times that the first and second wireless earpieces output audio signals based on the dual-channel audio stream.

39. An apparatus for wireless communication, comprising:
a latency controller configured to obtain at least one parameter from a data source that specifies timing for the apparatus and one or more data sinks to process information after receipt of a synchronization signal, wherein the at least one parameter is based on latencies associated with processing the information at the apparatus and at the one or more data sinks, respectively;
a receiver configured to wirelessly receive the synchronization signal and the information from the data source; and
an information processor configured to process the information at a time based on the at least one parameter and the synchronization signal.

40. The apparatus of claim 39, wherein:
the at least one parameter specifies a latency interval; and
the time at which the information is processed is based on the latency interval and a receipt time associated with the receipt of the synchronization signal.

41. The apparatus of claim 39, wherein the synchronization signal comprises at least one of: a preamble of a packet including the information, a delimiter following the preamble, or an independently coded signal.

42. The apparatus of claim 39, wherein:
the information comprises data or control information; and
the processing of the information comprises outputting a signal or invoking a control operation.

43. The apparatus of claim 39, wherein the information comprises audio data, video data, sensor data, or gaming data.

44. The apparatus of claim 39, wherein the obtaining of the at least one parameter comprises wirelessly receiving the at least one parameter.

45. The apparatus of claim 44, wherein the data source consists of a single wireless node.

46. The apparatus of claim 39, wherein the obtaining of the at least one parameter comprises negotiating with the data source to define the at least one parameter.

47. The apparatus of claim 39, wherein the at least one parameter is received via the synchronization signal, is acquired during setup of a channel, or is acquired via a back channel.

48. The apparatus of claim 39, wherein:
the at least one parameter specifies a latency interval;
the information comprises a synchronous data stream associated with one channel of a multi-channel data stream; and
the processing of the information comprises generating, based on the synchronous data stream, an output data stream delayed an amount of time based on the latency interval after receipt of the synchronization signal.

49. The apparatus of claim 39, wherein:
the at least one parameter specifies a latency interval;
the information comprises audio data associated with one channel of a multi-channel audio stream; and
the processing of the information comprises generating, based on the audio data, an audio signal delayed an amount of time based on the latency interval after receipt of the synchronization signal.

50. The apparatus of claim 49, wherein:
the information is received via a data packet; and
the synchronization signal comprises a preamble of the packet or a delimiter of the packet.

51. The apparatus of claim 49, wherein the information processor is further configured to define a delay period based on the specified latency interval and a duration of the processing of the information, wherein the processing of the information comprises delaying the generation of the audio signal for an amount of time specified by the delay period.

52. The apparatus of claim 39, wherein:
the synchronization signal comprises timing information for specifying processing times for the apparatus and the one or more data sinks; and
the time at which the information is processed comprises one of the processing times.

53. The apparatus of claim 52, wherein the apparatus and the one or more data sinks comprise physically separate wireless nodes.

54. The apparatus of claim 52, wherein the processing times are substantially concurrent or differ by at least one defined timing offset.

55. The apparatus of claim 52, wherein:
the information comprises at least a portion of a set of data destined for the apparatus and the one or more data sinks; and
the set of data comprises data packets, overlapping orthogonal code signals, overlapping pseudo-orthogonal code signals, or packets transmitted back-to-back.

56. The apparatus of claim 52, wherein the at least one parameter comprises at least a portion of a set of parameters for specifying the processing times for the apparatus and the one or more data sinks.

57. The apparatus of claim 52, wherein:
the information relates to a dual-channel audio stream;
the apparatus and the one or more data sinks comprise a first wireless earpiece and a second wireless earpiece; and
the processing times comprises times that the first and second wireless earpieces output audio signals based on the dual-channel audio stream.

58. A computer-program product for wireless communication, comprising:

non-transitory computer-readable medium containing computer instructions stored therein for causing a computer processor to execute codes to:
  obtain, at a data sink, at least one parameter from a data source that specifies timing for the data sink and one or more other data sinks to process information after receipt of a synchronization signal, wherein the at least one parameter is based on latencies associated with processing the information at the data sink and at the one or more other data sinks, respectively;
  wirelessly receive, at the data sink, the synchronization signal from the data source;
  wirelessly receive, at the data sink, information from the data source; and
  process, at the data sink, the information at a time based on the at least one parameter and the synchronization signal.

59. A headset, comprising:
a latency controller configured to obtain at least one parameter from a data source that specifies timing for the headset and one or more data sinks to process information after receipt of a synchronization signal, wherein the at least one parameter is based on latencies associated with processing the information at the headset and at the one or more data sinks, respectively;
a receiver configured to wirelessly receive the synchronization signal and the information from the data source;
an information processor configured to process the information at a time based on the at least one parameter and the synchronization signal; and
a transducer configured to provide an audio output based on the processed information.

60. A watch, comprising:
a latency controller configured to obtain at least one parameter from a data source that specifies timing for the watch and one or more data sinks to process information after receipt of a synchronization signal, and wherein the at least one parameter is based on latencies associated with processing the information at the watch and at the one or more data sinks, respectively;
a receiver configured to wirelessly receive the synchronization signal and the information from the data source;
an information processor configured to process the information at a time based on the at least one parameter and the synchronization signal; and
a user interface configured to provide an indication based on the processed information.

61. A sensing device, comprising:
a latency controller configured to obtain at least one parameter from a data source that specifies timing for the sensing device and one or more data sinks to process information after receipt of a synchronization signal, wherein the at least one parameter is based on latencies associated with processing the information at the sensing device and at the one or more data sinks, respectively;
a receiver configured to wirelessly receive the synchronization signal and the information from the data source;
an information processor configured to process the information at a time based on the at least one parameter and the synchronization signal; and
a sensor configured to sense based on the processed information.

* * * * *